(12) United States Patent
Hirano et al.

(10) Patent No.: US 11,536,584 B2
(45) Date of Patent: Dec. 27, 2022

(54) MAP DISPLAY SYSTEM AND MAP DISPLAY PROGRAM

(71) Applicants: AISIN CORPORATION, Kariya (JP); TOYOTA JIDOSHA KABUSHIKI KAISHA, Toyota (JP)

(72) Inventors: Toshiyuki Hirano, Okazaki (JP); Kazuya Ueda, Okazaki (JP); Xin Jin, Nagoya (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/258,210

(22) PCT Filed: Aug. 21, 2019

(86) PCT No.: PCT/JP2019/032635
§ 371 (c)(1),
(2) Date: Jan. 6, 2021

(87) PCT Pub. No.: WO2020/040196
PCT Pub. Date: Feb. 27, 2020

(65) Prior Publication Data
US 2021/0156707 A1    May 27, 2021

(30) Foreign Application Priority Data
Aug. 23, 2018    (JP) .............................. JP2018-156059

(51) Int. Cl.
*G09B 29/00*    (2006.01)
*G01C 21/36*    (2006.01)

(52) U.S. Cl.
CPC ..... *G01C 21/3673* (2013.01); *G01C 21/3676* (2013.01); *G09B 29/00* (2013.01); *G01C 21/3667* (2013.01)

(58) Field of Classification Search
CPC .................. G01C 21/3676; G01C 21/3673
See application file for complete search history.

(56) References Cited

U.S. PATENT DOCUMENTS

| 8,711,181 B1* | 4/2014 | Nourse ................ G01C 21/367 345/660 |
| 2005/0143914 A1* | 6/2005 | Yamada ............... G09B 29/106 340/995.27 |
| 2009/0105944 A1* | 4/2009 | Urano ................ G01C 21/3673 701/533 |

FOREIGN PATENT DOCUMENTS

JP    2011-043371 A    3/2011

OTHER PUBLICATIONS

International Search Report of PCT/JP2019/032635 dated Nov. 19, 2019 [PCT/ISA/210].

* cited by examiner

*Primary Examiner* — Anne Marie Antonucci
*Assistant Examiner* — Jared C Bean
(74) *Attorney, Agent, or Firm* — Sughrue Mion, PLLC (57) ABSTRACT

There is provided a technique that can appropriately display route icons. A map display system includes a display section obtaining part that obtains display sections each being a section of a route to be displayed on a map; a connecting point obtaining part that obtains a connecting point, the connecting point being a point where different routes are connected together on the display sections; and a map display part that displays at least one route icon for each split section, the route icon being an image associated with a route, and the split section being obtained by splitting each of the display sections by the connecting point.

8 Claims, 3 Drawing Sheets

MAP DISPLAY SYSTEM AND MAP DISPLAY PROGRAM

CROSS REFERENCE TO RELATED APPLICATIONS

This application is a National Stage Entry of International Application No. PCT/JP2019/032635, filed Aug. 21, 2019, which designates the United States, incorporated herein by reference, and which claims the benefit of priority from Japanese Patent Application No. 2018-156059, filed Aug. 23, 2018, the contents of which are incorporated in their entirety.

TECHNICAL FIELD

The present disclosure relates to a map display system and a map display program.

BACKGROUND ART

There is known a technique for displaying road icons representing route numbers at predetermined display locations (longitude and latitude) (see Patent Literature 1.).

CITATIONS LIST

Patent Literature

Patent Literature 1: JP 2011-43371 A

SUMMARY OF THE DISCLOSURE

Technical Problems

In Patent Literature 1, there has been a problem that when a latitude-longitude area displayed on a map is changed, the display mode of road icons becomes inappropriate. For example, there is a case in which depending on the latitude-longitude area displayed on the map, the number of display locations of road icons present on the map is insufficient, causing a problem that it becomes difficult to recognize route numbers. On the other hand, there is a case in which the number of display locations of road icons present on the map is excessive, causing a problem that the visibility of the map deteriorates due to a large number of the road icons. As a result, there has been a problem that it cannot be appropriately visually recognized which road displayed on the map corresponds to which route number.

The present disclosure is made in view of the above-described problem, and provides a technique that can appropriately display route icons so that a user can visually recognize a route number corresponding to a road from map display.

Solutions to Problems

To provide the above-described technique, a map display system of the present disclosure includes: a display section obtaining part that obtains display sections each being a section of a route to be displayed on a map; a connecting point obtaining part that obtains a connecting point, the connecting point being a point where different routes are connected together on the display sections; and a map display part that displays at least one route icon for each split section, the route icon being an image associated with a route, and the split section being obtained by splitting each of the display sections by the connecting point.

To provide the above-described technique, a map display program of the present disclosure causes a computer to function as: a display section obtaining part that obtains display sections each being a section of a route to be displayed on a map; a connecting point obtaining part that obtains a connecting point, the connecting point being a point where different routes are connected together on the display sections; and a map display part that displays at least one route icon for each split section, the route icon being an image associated with a route, and the split section being obtained by splitting each of the display sections by the connecting point.

In the above-described configurations, when different routes are connected together, the routes are easily confused on display of a map. Hence, around a connecting point where routes are connected together, it is confusing to figure out which directions the routes are connected to. By displaying a route icon for each split section which is obtained by splitting a display section of a route displayed on the map by a connecting point, it becomes possible to clearly identify the route names of routes before and after the connecting point.

DESCRIPTION OF EMBODIMENTS

Figure 1:
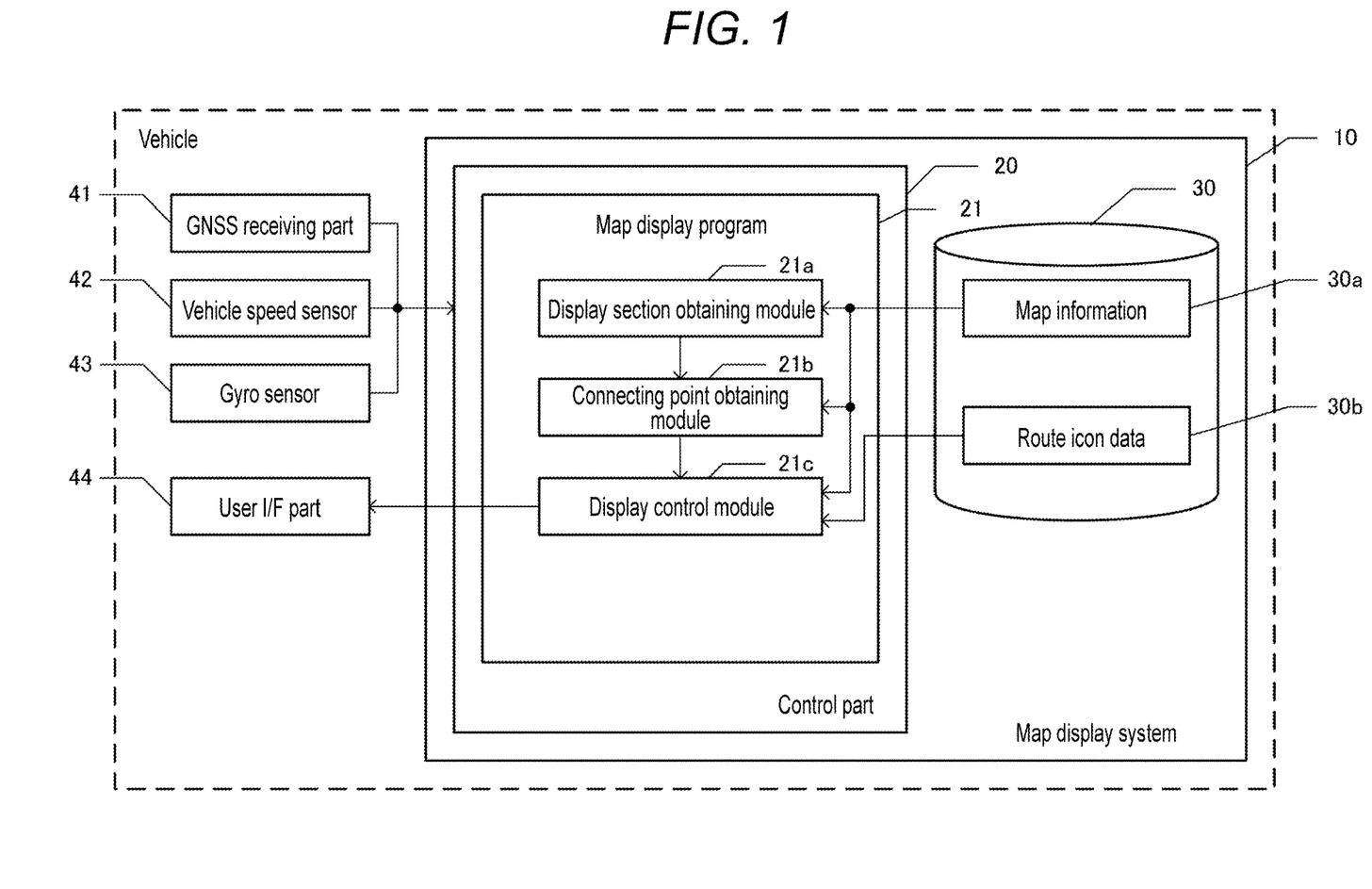
FIG. 1 is a block diagram of a map display system.

Here, an embodiment of the present disclosure will be described in the following order:
  (1) Configuration of a map display system;
  (2) Map display process; and
  (3) Other embodiments.
  (1) Configuration of a map display system:
FIG. 1 is a block diagram showing a configuration of a map display system 10 according to one embodiment of the present disclosure. The map display system 10 is provided in a vehicle. The map display system 10 includes a control part 20 and a recording medium 30. The control part 20 includes a CPU, a RAM, a ROM, etc., and executes a map display program 21 stored in the recording medium 30 or the ROM.

The recording medium 30 has map information 30a and route icon data 30b recorded therein. The map information 30a includes node data and link data. The node data is data representing the coordinates of a node to which two or more links are connected, etc. The links correspond to road sections obtained by dividing a road at every connecting point. The connecting points include merge points, divergence points, junctions, interchanges, etc. The link data represents various types of information about a road section. The link data represents at least the shape of the road section and route information. The shape of the road section is identified by shape interpolation data representing the coordinates of shape interpolation points set in a width direction of the road.

The route information is information indicating the road rank type and route name of the road section. The road rank type is a classification of the rank of a road including the road section. For example, as the road rank types, expressways, general toll roads, national highways, prefectural roads, city roads, narrow streets, etc., are classified. The route name is the name of a route including the road section, and is a name, an abbreviated name, a symbol, or a number unique to the route. Normally, the route includes a plurality of continuous road sections.

Figure 2A:
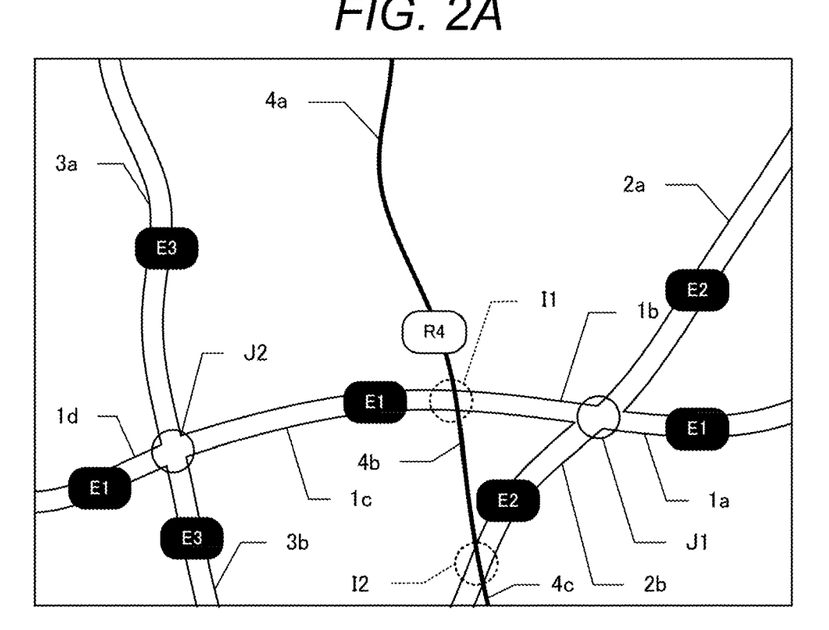
FIGS. 2A and 2B are examples of a map.
Figure 2B:
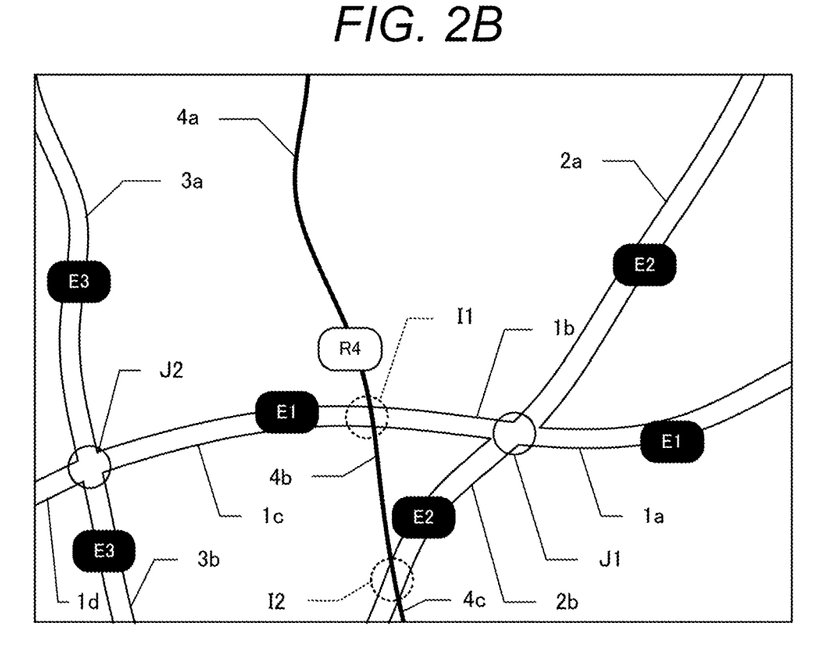

The route icon data 30b is a database that records route icons which are images unique to respective routes. The route icons are images displayed on a map so as to overlap routes. The route icons are recorded so as to be associated with the respective routes represented by the link data in the map information 30a. FIGS. 2A and 2B show examples of a map. In the drawings, three expressway routes are represented by thick white lines, and one national highway route is represented by a black line. The expressway routes are given "E1 to E3", respectively, as route names (abbreviated names), and the national highway route is given "R4" as a route name (abbreviated name). As shown in FIGS. 2A and 2B, the route icons are rectangular images representing the abbreviated names of the respective routes, and the text color and background color differ between the expressways and the national highway.

The vehicle includes a global navigation satellite system (GNSS) receiving part 41, a vehicle speed sensor 42, a gyro sensor 43, and a user I/F part 44. The GNSS receiving part 41 receives radio waves from GNSS satellites and outputs a signal for calculating a current location of the vehicle through an interface which is not shown. The vehicle speed sensor 42 outputs a signal corresponding to the rotational speed of wheels included in the vehicle. The control part 20 obtains vehicle speed based on the signal from the vehicle speed sensor 42. The gyro sensor 43 detects angular acceleration of the vehicle for a turn in a horizontal plane, and outputs a signal corresponding to the orientation of the vehicle. The control part 20 obtains a traveling direction of the vehicle based on the signal from the gyro sensor 43. The control part 20 identifies a travel path of the vehicle based on the output signals from the vehicle speed sensor 42, the gyro sensor 43, and the like, and thereby obtains a current location of the vehicle. The output signal from the GNSS receiving part 41 is used to, for example, correct the current location of the vehicle which is identified by the vehicle speed sensor 42, the gyro sensor 43, and the like.

The user I/F part 44 is an interface part for providing various types of information to a user and accepting, as input, instructions from the user, and is specifically a touch panel display. The touch panel display displays a map. The control part 20 outputs a control signal to the touch panel display to output an arbitrary image. In addition, the control part 20 obtains user's operations based on touch operations performed on the touch panel display.

The map display program 21 includes a display section obtaining module 21a, a connecting point obtaining module 21b, and a map display module 21c. The display section obtaining module 21a, the connecting point obtaining module 21b, and the map display module 21c are program modules that cause the control part 20 serving as a computer to function as a display section obtaining part, a connecting point obtaining part, and a map display part, respectively.

By a function of the display section obtaining module 21a, the control part 20 obtains a display section which is a section of a route to be displayed on a map. By the function of the display section obtaining module 21a, the control part 20 sets the scale, orientation, reference coordinates, and display size of a map displayed on the touch panel display. The reference coordinates are, for example, coordinates (latitude and longitude) shown at the center of the map and may be, for example, the coordinates of the current location of the vehicle, arbitrary coordinates specified by the user by a scrolling operation, etc., or the coordinates of a facility searched by the user. The scale of the map may be a scale specified by the user.

The orientation of the map may be, for example, orientation (heading up) in which the traveling direction of the vehicle is shown upward, orientation (north up) in which the north faces upward, or arbitrary orientation specified by the user. The display size indicates the physical size of the map displayed on the touch panel display and is, for example, the entire screen size of the touch panel display when in full-screen mode. Note that it is assumed that the shape of the map is rectangular.

The control part 20 identifies a coordinate range in the actual space displayed on the map, based on the scale, orientation, reference coordinates, and display size of the map. Specifically, the control part 20 identifies a shape in the actual space of an area displayed on the map, based on the display size and scale, and further identifies a map display area which is an area in the actual space shown on the map, based on the reference coordinates and orientation of the map.

The control part 20 extracts road sections that are at least partially present in the map display area in the actual space, from the map information 30a. Note that for a road section that intersects an edge (upper, lower, left, or right side) of the map, the control part 20 cuts the road section at the edge of the map and extracts a portion of the road section in the map display area as a virtual road section. Then, the control part 20 connects road sections given the same route name among the extracted road sections, and thereby obtains a display section for each route.

In FIGS. 2A and 2B, a display section of the expressway with the route name "E1" includes a road section 1a between the right side of the map and a junction J1, a road section 1b between the junction J1 and an interchange I1, a road section 1c between the interchange I1 and a junction J2, and a road section 1d between the junction J2 and the left side of the map. The junction J1 is a connecting point between the expressway with the route name "E1" and the expressway with the route name "E2". The interchange I1 is a connecting point between the expressway with the route name "E1" and the national highway with the route name "R4". The junction J2 is a connecting point between the expressway with the route name "E1" and the expressway with the route name "E3".

In FIGS. 2A and 2B, a display section of the expressway with the route name "E2" includes a road section 2a between the right side or upper side of the map and the junction J1 and a road section 2b between the junction J1 and the lower side of the map. In FIGS. 2A and 2B, a display section of the expressway with the route name "E3" includes a road section 3a between the upper side or left side of the map and the junction J2 and a road section 3b between the junction J2 and the lower side of the map.

In FIGS. 2A and 2B, a display section of the national highway with the route name "R4" includes a road section 4a between the upper side of the map and the interchange I1, a road section 4b between the interchange I1 and an interchange I2, and a road section 4c between the interchange I2 and the lower side of the map. Note that the interchange I2 is a connecting point between the expressway with the route name "E2" and the national highway with the route name "R4".

By a function of the connecting point obtaining module 21b, the control part 20 obtains a connecting point which is a point where different routes are connected together on display sections. In the present embodiment, the connecting point is a same-rank connecting point where routes of the same rank are connected together on display sections. Here, the same-rank connecting point is a connecting point where two or more routes of the same road rank type are connected together. In FIGS. 2A and 2B, the junctions J1 and J2 where routes whose road rank types are expressways are connected together are obtained as same-rank connecting points. On the other hand, in FIGS. 2A and 2B, the interchanges I1 and I2 where a route whose road rank type is an expressway and a route whose road rank type is a national highway are connected together are not obtained as same-rank connecting points.

By a function of the map display module 21c, the control part 20 displays at least one route icon which is an image associated with a route, for each split section obtained by splitting a display section by a connecting point. Namely, the control part 20 obtains same-rank connecting points present on a display section of each route, and sets sections obtained by splitting the display section by each same-rank connecting point, as split sections. Then, the control part 20 sets to display one route icon per split section.

In FIGS. 2A and 2B, the display section of the expressway with the route name "E1" is split into three split sections at the junctions J1 and J2 which are same-rank connecting points. Namely, the display section of the expressway with the route name "E1" is split into a split section including the road section 1a, a split section including the road sections 1b and 1c, and a split section including the road section 1d.

In FIGS. 2A and 2B, the display section of the expressway with the route name "E2" is split into two split sections at the junction J1 which is a same-rank connecting point. In addition, the display section of the expressway with the route name "E3" is split into two split sections at the junction J2 which is a same-rank connecting point. On the other hand, the display section of the national highway with the route name "R4" does not have even a single same-rank connecting point thereon, and thus, the display section is not split.

Here, by the function of the map display module 21c, the control part 20 displays a route icon at the center of a split section having two continuous same-rank connecting points at its both ends. Furthermore, by the function of the map display module 21c, the control part 20 displays a route icon at the center of a split section which is divided by one same-rank connecting point and an edge of the map. Here, the split sections can include a split section having same-rank connecting points at its both ends and a split section having a same-rank connecting point at its one end and an edge (upper, lower, left, or right side) of the map at its other end. In the present embodiment, the control part 20 displays a route icon at the center of a split section regardless of what kind of point is present at the edges of the split section.

The control part 20 identifies a point on a split section where the length on a road of the split section is divided into two parts, based on shape interpolation points and the coordinates of nodes, and displays a route icon at a location on the map that indicates the point. In FIGS. 2A and 2B, a map icon representing "E1" is displayed at a location where the length of a split section (the road sections 1b and 1c) having, at its both ends, the junctions J1 and J2 which are same-rank connecting points among the split sections of the expressway with the route name "E1" is divided into two parts. In addition, for a split section having an edge (upper, lower, right, or left side) of the map at its one end, too, a map icon is displayed at a location where the length of the split section is divided into two parts.

Note, however, that by the function of the map display module 21c, the control part 20 does not display a route icon on a split section whose length is less than a threshold value. The control part 20 obtains the length of a split section based on shape interpolation points and the coordinates of nodes, and converts the length to a length on the map based on the scale. Then, when the length on the map of the split section is less than the threshold value (e.g., the width of a map icon), the control part 20 does not display a route icon for the split section.

In FIG. 2A, a route icon representing "E1" is displayed at the center of a split section (road section 1d) between the left edge of the map and the junction J2 on the expressway with the route name "E1". However, in FIG. 2B, a route icon is not displayed at the center of the split section (road section 1d) between the left edge of the map and the junction J2. This is because the length of the split section (road section 1d) between the left edge of the map and the junction J2 is changed to less than or equal to the threshold value due to the map scrolled left in FIG. 2B from FIG. 2A.

By the function of the map display module 21c, when there is not even a single same-rank connecting point, the control part 20 displays a route icon at the center of a display section without splitting the display section. As described above, in FIGS. 2A and 2B, since the display section of the national highway with the route name "R4" does not have even a single same-rank connecting point thereon, the display section is not split.

In this case, the control part 20 displays a route icon at the center of the entire display section.

In addition, by the function of the map display module 21c, when a plurality of route icons overlap each other on the map, the control part 20 displays only one of the overlapping route icons. By the function of the map display module 21c, the control part 20 obtains a central location on the map of each split section as the location of a route icon, and obtains a distance between the locations of route icons. When the distance between the locations of route icons is less than or equal to a threshold value (e.g., the width of a route icon), the control part 20 does not display one of the route icons.

By the function of the map display module 21c, the control part 20 obtains the locations, shapes, etc., of various types of ground objects (road sections, connecting points, facilities, etc.) in the map display area in the actual space from the map information 30a, and renders a map. Then, the control part 20 superimposes and displays route icons on the respective split sections shown on the map.

In the configuration of the present embodiment described above, by displaying a route icon for each split section which is obtained by splitting a display section of a route displayed on a map by a same-rank connecting point, it becomes possible to clearly identify the route names of routes before and after the same-rank connecting point. Namely, around a same-rank connecting point where routes of the same rank are connected together, it is confusing to figure out which directions the routes are connected to, but since route icons are shown before and after the same-rank connecting point, the routes can be easily recognized.

For example, in FIGS. 2A and 2B, when the vehicle has traveled the expressway with the route name "E1" in a left direction and reached the junction J1, it is confusing to figure out whether the vehicle continuously travels on the same route when traveling straight ahead, or whether the vehicle continuously travels on the same route when traveling in a left direction. Regarding this, since route icons are displayed on respective split sections each having the junction J1 as an end point, it can be clearly recognized that the vehicle continuously travels on the same route when traveling straight ahead.

In addition, by displaying a route icon at the center of a split section, the possibility that the route icon gets too close to a same-rank connecting point or an edge of a map is reduced, enabling to reduce the possibility of a reduction in the visibility of the same-rank connecting point or the route icon. In addition, a route icon can be displayed at a location whose distances to two same-rank connecting points at both ends are the same, and thus, the route icon can be easily found from both sides of the two same-rank connecting points at both ends.

Furthermore, by not displaying a route icon on a split section whose length is less than the threshold value, the possibility that the visibility of a map is impaired due to a route icon getting too close to a same-rank connecting point or due to route icons arranged too densely can be reduced. In addition, when there is not even a single same-rank connecting point, a route icon is displayed at the center of a display section without splitting the display section, by which even when there is no same-rank connecting point, a route icon can be displayed. Therefore, the possibility of not displaying even a single route icon for a given route can be reduced. By displaying, when a plurality of route icons overlap each other on a map, only one of the overlapping route icons, the possibility that the appearance of a map deteriorates due to the overlap of the route icons can be reduced.

Figure 3:
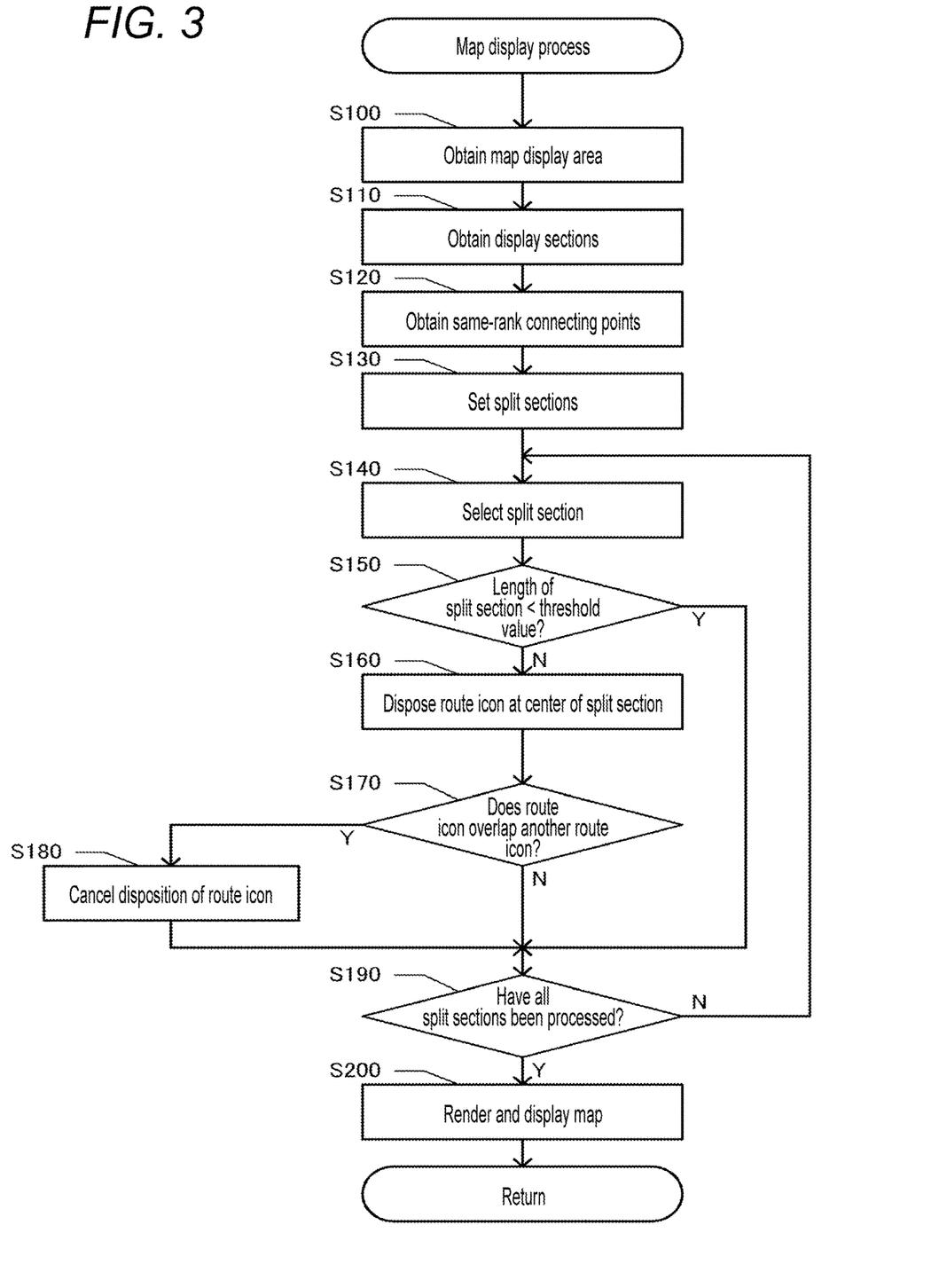
FIG. 3 is a flowchart of a map display process.

(2) Map display process:

Next, a map display process performed by the functions of the map display program 21 will be described. FIG. 3 is a flowchart of a map display process. The map display process is a process performed when a map is newly displayed or when a map is updated and displayed, and may be performed every time any one of the scale, orientation, and reference coordinates of a map is updated.

First, by the function of the display section obtaining module 21a, the control part 20 obtains a map display area (step S100). Namely, the control part 20 obtains a map display area which is an area in the actual space displayed on a map, based on the scale, orientation, reference coordinates, and display size of the map.

Then, by the function of the display section obtaining module 21a, the control part 20 obtains display sections (step S110). The control part 20 extracts road sections that are at least partially present in the map display area in the actual space, from the map information 30a and connects together road sections given the same route name among the extracted road sections, and thereby obtains display sections for respective routes. Note that for a road section that intersects an edge (upper, lower, left, or right side) of the map, the control part 20 cuts the road section at the edge of the map and treats a portion of the road section in the map display area as a virtual road section.

Then, by the function of the connecting point obtaining module 21b, the control part 20 obtains same-rank connecting points (step S120). Namely, the control part 20 obtains, as a same-rank connecting point, a connecting point where two or more routes of the same road rank type are connected together among connecting points where a plurality of road sections are connected together on display sections.

Then, by the function of the map display module 21c, the control part 20 sets split sections (step S130). Namely, the control part 20 sets split sections by splitting a display section of each route by a same-rank connecting point on the display section. The split sections can include a split section having same-rank connecting points at its both ends and a split section having a same-rank connecting point at its one end and an edge (upper, lower, left, or right side) of the map at its other end.

Then, by the function of the map display module 21c, the control part 20 selects a split section (step S140). Namely, the control part 20 selects one split section which is a processing target from among the plurality of split sections set at step S140. Then, by the function of the map display module 21c, the control part 20 determines whether the length of the split section is less than the threshold value (step S150). For example, the control part 20 determines whether the length on the map of the processing-target split section is less than the width of a map icon serving as the threshold value.

If it is not determined that the length of the split section is less than the threshold value (step S150: N), by the function of the map display module 21c, the control part 20 disposes a route icon at the center of the split section (step S160). Namely, the control part 20 identifies a location on the processing-target split section where the length of the split section is divided into two parts, and sets to display a route icon representing the route name of the split section at the location.

Then, by the function of the map display module 21c, the control part 20 determines whether the route icon overlaps another route icon (step S170). Specifically, the control part 20 obtains a distance on the map between the location of the route icon which is newly disposed at immediately preceding step S160 and the location of a route icon already disposed, and determines whether the distance (minimum value) between the locations of the route icons is less than or equal to the threshold value.

If it is determined that the route icon overlaps another route icon (step S170: Y), by the function of the map display module 21c, the control part 20 cancels the disposition of the route icon (step S180). Namely, the control part 20 sets to not display the route icon disposed at immediately preceding step S160.

For example, at step S140, the control part 20 may select a processing-target split section of a route with a small number of split sections first. By this, identical route icons to be displayed whose number is small can be given priority to be displayed. In addition, the control part 20 may select a processing-target split section of a route with a high road rank first. By this, route icons for a route with a high road rank can be given priority to be displayed.

On the other hand, if it is not determined that the route icon overlaps another route icon (step S170: N), by the function of the map display module 21c, the control part 20 skips step S180 and proceeds to step S190. In addition, if it is determined that the length of the split section is less than the threshold value (step S150: Y), by the function of the map display module 21c, the control part 20 skips step S160 to S180 and proceeds to step S190.

Then, by the function of the map display module 21c, the control part 20 determines whether all split sections have been processed (step S190). Namely, the control part 20 determines whether a process of disposing a route icon (step S150 to S180) has been completed for all split sections.

If it is not determined that all split sections have been processed (step S190: N), by the function of the map display module 21c, the control part 20 returns to step S140. Namely, the control part 20 performs the process of disposing a route icon (step S150 to S180) for the remaining split sections serving as processing targets. By this, route icons can be sequentially disposed at the centers of the respective split sections.

If it is determined that all split sections have been processed (step S190: Y), by the function of the map display module 21c, the control part 20 renders and displays a map (step S200). Namely, by the function of the map display module 21c, the control part 20 obtains the locations, shapes, etc., of various types of ground objects (road sections, connecting points, facilities, etc.) in the map display area in the actual space from the map information 30a, and renders a map. Then, the control part 20 superimposes and displays a route icon at the center of a split section where a route icon is disposed at step S160 and the disposition of the route icon is not cancelled at step S180 among the split sections shown on the map.

(3) Other embodiments:

In the present disclosure, a connecting point may be a point where different routes are connected together, instead of a same-rank connecting point. In this case, for example, in the example shown in FIG. 2A, the interchange I1 which is a point where the expressway with the route name "E1" and the national highway with the route name "R4" are connected together on the map (actual roads do not necessarily need to be connected together) is a connecting point. In addition, the interchange I2 is also a connecting point. In this case, the control part 20, for example, displays the route name "R4", for example, at the center of the road section 4a between the interchange I1 and the upper side. Likewise, the control part 20 displays the route name "E1" on the road section 1c and the route name "E1" on the road section 1b. In addition, the control part 20 displays the route name "R4" on the road section 4b between the interchanges I1 and I2, and the route name "E2" on the road section 2b between the junction J1 and the interchange I2. Needless to say, in this configuration, too, it is preferred that a route icon be displayed on a split section which is divided by a connecting point and an edge of the map, and it is preferred that when the length of the split section is less than the threshold value, the display of the route icon be omitted. Hence, for example, in the example shown in FIG. 2A, a split section divided by the interchange I2 and an edge (lower side) of the map on the road with the route name "R4" is short in length and is determined to be less than the threshold value, and thus, it is preferred that display of a route icon be omitted. The same also applies to a split section divided by the interchange I2 and an edge (lower side) of the map on the road with the route name "E2".

In addition, a route icon does not necessarily need to be displayed at the center of a split section. For example, the control part 20 may display a route icon at each of points that divide a split section into N parts (N is an integer greater than or equal to 3). In this case, N−1 route icons are displayed per split section. In addition, the control part 20 may set N to a larger integer for a longer split section. Furthermore, the control part 20 may display a route icon at a location on a split section whose distance from a connecting point is a predetermined distance. By this, the route icon can be securely displayed around the connecting point.

In addition, the control part 20 does not necessarily need to split a display section at all connecting points. For example, the control part 20 may split a display section only at a narrow-angle connecting point where an angle formed by road sections is less than or equal to a reference angle (e.g., 45 degrees). By this, a route icon can be displayed around a point where road sections intersect each other in similar directions, enabling to reduce confusion between routes having similar directions.

In the present disclosure, the map display system may be any system as long as the system is for displaying a map, and uses of a map are not particularly limited. In addition, the map display system may display a map on an in-vehicle display or may display a map on a portable terminal such as a smartphone. The map display system may be configured in any manner as long as the system displays a map on a display, and does not necessarily need to include a display. Routes are passage roads through which transportation means such as vehicles can pass, and are associated with unique names or route numbers, respectively. The routes may be roads through which automobiles can pass or may be railroad routes.

Each route connects a start point to an end point, but in many cases, a part (display section) of the route is displayed on a map instead of displaying the entire route on the map. The display section obtaining part may obtain a display section based on the display location or scale of the map. The display section is a section whose both ends are present at edges of the map.

A connecting point is a point where routes are connected together, and is an intersection, a merge point, a divergence point, etc. Routes of the same rank may be routes having the same display mode (thickness, color, the type of line, etc.) on a map, or may be routes having the same road type or road manager, or may be routes having the same road size such as the number of lanes. A same-rank connecting point may be any point as long as the point has at least two routes of the same rank connected together, and may be a point where three or more routes of the same rank are connected together, or may be a route where another route of a different rank is connected. Meanwhile, a point where a given route is connected to only a route having a different rank than the route is not a same-rank connecting point.

Note that a same-rank connecting point does not necessarily need to be a point where two or more routes of the same rank are strictly connected together, and may be a point that looks like two or more routes of the same rank are connected together on a map. Specifically, a same-rank connecting point may be a point where two or more routes of the same rank approach each other within a predetermined distance (a distance in the actual space or a distance on the map). A split section is a section obtained by splitting a display section by a same-rank connecting point, and is a section whose end point is the same-rank connecting point or an edge of the map.

A route icon may be any image as long as the image is associated with a route, and may be any image as long as the image represents a name or a number unique to the route. The map display part may be configured in any manner as long as the map display part displays at least one route icon per split section, and may display two or more route icons per split section. Furthermore, the map display part may set the number of route icons according to the length of a split section, etc., and in this case, too, the map display part may be configured in any manner as long as the map display part displays one route icon at minimum per split section. Displaying a route icon on a split section may indicate displaying a route icon on a split section in an overlapping manner, or displaying a route icon near a split section, or displaying a route icon in a word balloon from a route icon.

Here, the map display part may display a route icon at the center of a split section having two continuous same-rank connecting points at its both ends. By this, the possibility that the route icon gets too close to either one of the two same-rank connecting points at both ends is reduced, enabling to reduce the possibility of a reduction in the visibility of the same-rank connecting points or the route icon. The route icon can be displayed at a location whose distances to the two same-rank connecting points at both ends are the same, and thus, the route icon can be easily found from both sides of the two same-rank connecting points at both ends. The center of the split section may be a location where the length of the split section is divided into two parts, or may be a location where the split section is divided into two parts in a horizontal direction or a vertical direction on the display, or may be a location where the split section is divided into two parts in an east-west direction or a north-south direction.

Furthermore, the map display part may display a route icon at the center of a split section which is divided by one same-rank connecting point and an edge of a map. By this, the possibility that the route icon gets too close to the same-rank connecting point is reduced, enabling to reduce the possibility of a reduction in the visibility of the same-rank connecting point or the route icon. The possibility of a reduction in the visibility of the route icon due to the route icon getting too close to the edge of the map can be reduced.

Furthermore, when there is not even a single same-rank connecting point, the map display part may display a route icon at the center of a display section without splitting the display section. By this, even when there is no same-rank connecting point, a route icon can be displayed, enabling to reduce the possibility that even a single route icon is not displayed for a given route.

In addition, the map display part may be configured to not display a route icon on a split section whose length is less than the threshold value. Here, by configuring the map display part to not display a route icon on a split section whose length is less than the threshold value, the possibility that the visibility of a map is impaired due to a route icon getting too close to a same-rank connecting point or due to route icons arranged too densely can be reduced. Therefore, the possibility of a reduction in the visibility of same-rank connecting points can be reduced. The threshold value may be determined using a distance on the map or may be determined using a distance in the actual space.

In addition, when a plurality of route icons overlap each other on a map, the map display part may display only one of the overlapping route icons. By this, the possibility that the appearance of the map deteriorates due to the overlap of the route icons can be reduced. Needless to say, the map display part may avoid display of a route icon not only when route icons overlap each other, but also when a route icon overlaps display of other ground objects. Furthermore, when a route icon overlaps display of another route icon or a ground object on the map, the map display part may correct the location of the route icon to a location where the overlap does not occur.

Furthermore, as in the present disclosure, a technique for displaying a route icon based on a same-rank connecting point can also be applied as a program or a method. In addition, the system, program, or method such as that described above may be implemented as a single device or may be implemented by using a component shared with each part included in the vehicle, and includes various types of modes. For example, it is possible to provide a navigation system including a device such as that described above, a navigation system, a method, or a program. In addition, changes can be made as appropriate, e.g., a part is software and a part is hardware. Furthermore, the aspects of the disclosure are also feasible as a recording medium for a program that controls the device. Needless to say, the recording medium for software may be a magnetic recording medium or may be a semiconductor memory, and any recording medium to be developed in the future can also be considered exactly in the same manner.

REFERENCE SIGNS LIST

10: Map display system, 20: Control part, 21: Map display program, 21a: Display section obtaining module, 21b: Connecting point obtaining module, 21c: Map display module, 30: Recording medium, 30a: Map information, 30b: Route icon data, 41: GNSS receiving part, 42: Vehicle speed sensor, 43: Gyro sensor, and 44: User I/F part

The invention claimed is:

1. A map display system comprising:
at least one processor configured to implement:
a display section obtaining part that obtains display sections each being a section of a route to be displayed on a map;
a connecting point obtaining part that obtains a connecting point, the connecting point being a point where different routes are connected together on the display sections; and
a map display part that displays at least one route icon for each split section, the route icon being an image associated with a route, and each split section being obtained by splitting each of the display sections by the connecting point,
wherein the connecting point is a same-rank connecting point where routes of a same rank are connected together on the display sections and the map display part displays the route icon at a center of the split section having two continuous connecting points at both ends of the split section.

2. The map display system according to claim 1, wherein the map display part displays the route icon at a center of the split section divided by one connecting point and an edge of the map.

3. The map display system according to claim 1, wherein when there is not even a single connecting point, the map display part displays the route icon at a center of each of the display sections without splitting the display sections.

4. The map display system according to claim 1, wherein the map display part does not display the route icon on the split section whose length is less than a threshold value.

5. The map display system according to claim 1, wherein when a plurality of route icons overlap each other on the map, the map display part displays only one of the overlapping route icons.

6. The map display system according to claim 1, wherein the map display part displays the route icon at the center of the split section when routes of a different rank cross the split section.

7. A map display program stored on a non-transitory computer readable medium causing a computer processor to function as:
a display section obtaining part that obtains display sections each being a section of a route to be displayed on a map;
a connecting point obtaining part that obtains a connecting point, the connecting point being a point where different routes are connected together on the display sections; and
a map display part that displays at least one route icon for each split section, the route icon being an image associated with a route, and each split section being obtained by splitting each of the display sections by the connecting point, wherein the connecting point is a same-rank connecting point where routes of a same rank are connected together on the display sections and the map display part displays the route icon at a center of the split section having two continuous connecting points at both ends of the split section.

8. The map display program according to claim 7, wherein the map display part displays the route icon at the center of the split section when routes of a different rank cross the split section.

\* \* \* \* \*